(No Model.)  3 Sheets—Sheet 1.

H. G. MORRIS & P. G. SALOM.
ELECTRIC CARRIAGE.

No. 541,001. Patented June 11, 1895.

(No Model.)  3 Sheets—Sheet 2.

H. G. MORRIS & P. G. SALOM.
ELECTRIC CARRIAGE.

No. 541,001. Patented June 11, 1895.

Witnesses:
R. Schleicher
Chas. A. ___

Inventors:
Henry G Morris and
Pedro G Salom
by their Attorneys
Howson & Howson (No Model.) 3 Sheets—Sheet 3.

H. G. MORRIS & P. G. SALOM.
ELECTRIC CARRIAGE.

No. 541,001. Patented June 11, 1895.

Witnesses:
R. Schleicher
Chas. DeCou

Inventors:
Henry G. Morris
Pedro G. Salom
by their Attorneys
Howson & Howson

UNITED STATES PATENT OFFICE.

HENRY G. MORRIS AND PEDRO G. SALOM, OF PHILADELPHIA, PENNSYLVANIA.

ELECTRIC CARRIAGE.

SPECIFICATION forming part of Letters Patent No. 541,001, dated June 11, 1895.

Application filed January 19, 1895. Serial No. 535,545. (No model.)

*To all whom it may concern:*

Be it known that we, HENRY G. MORRIS and PEDRO G. SALOM, citizens of the United States, and residents of Philadelphia, Pennsylvania, have invented certain Improvements in Electric Carriages, of which the following is a specification.

One object of our invention is to so construct an electric carriage, that while the motor is positively and rigidly geared to the driving wheels or axle, the frame carrying the motor is elastically supported at the front end. Hence the motor is relieved in great measure from the jar of traveling over rough roads, the body of the carriage being elastically supported at both ends.

A further object of the invention is to provide for the complete control of the carriage by the operator at all times and the ready reversal of the direction of movement.

Our invention also relates to a special construction of the frame of the carriage, as fully described hereinafter.

Figure 1:
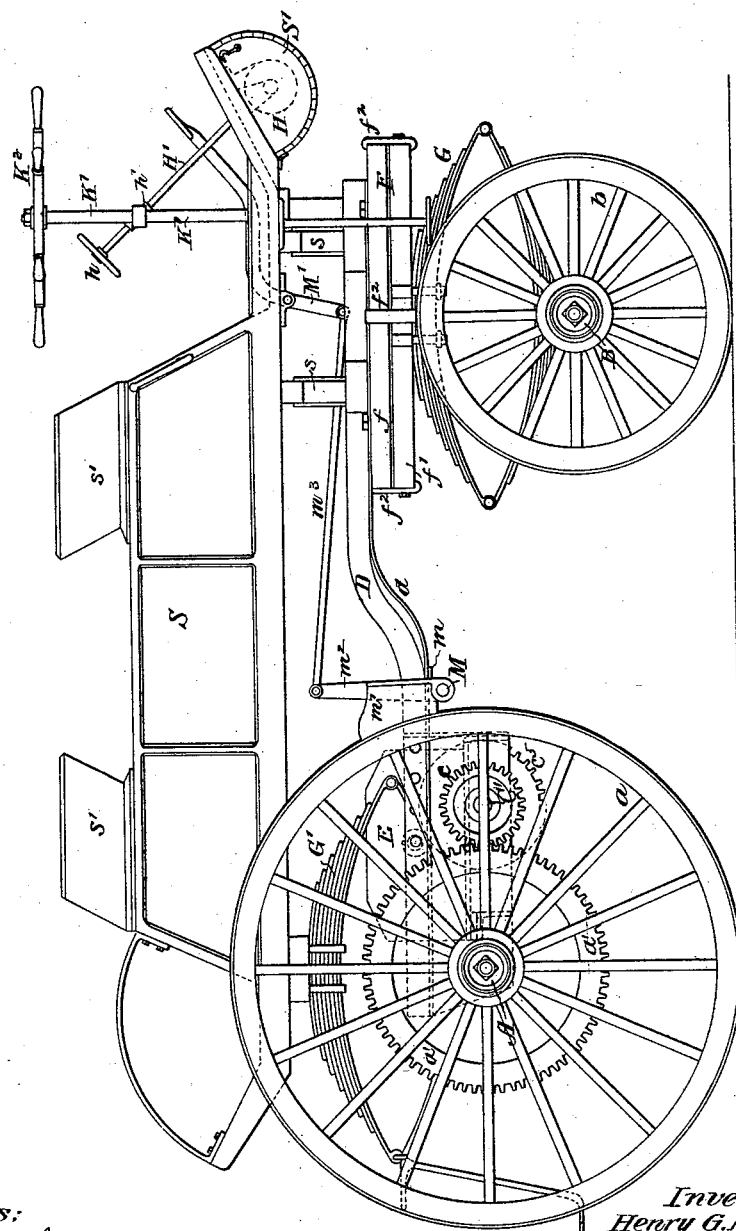
Figure 2:
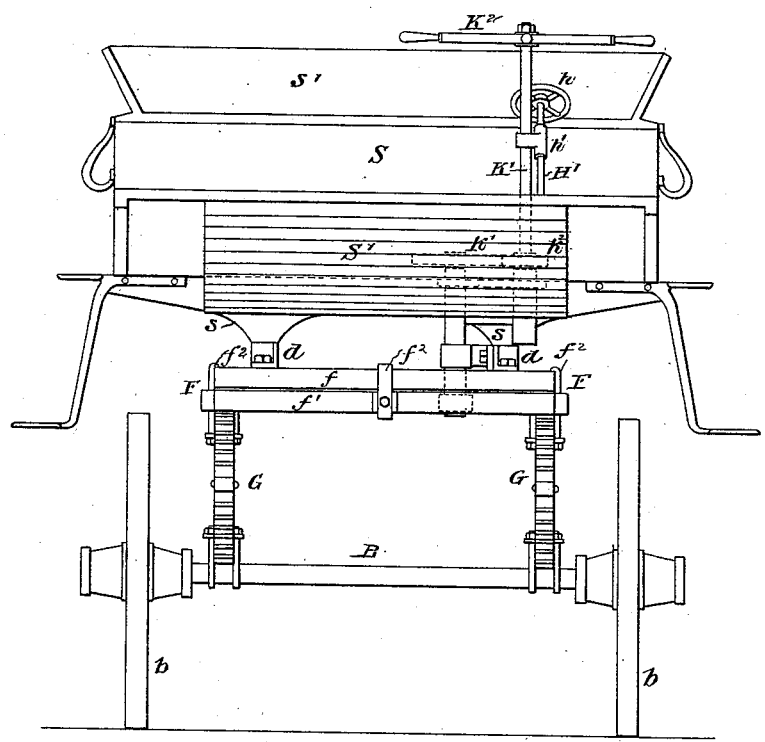
Figure 4:
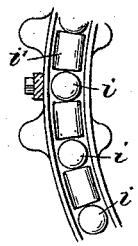
Figure 5:
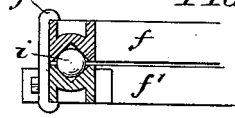
Figure 3:
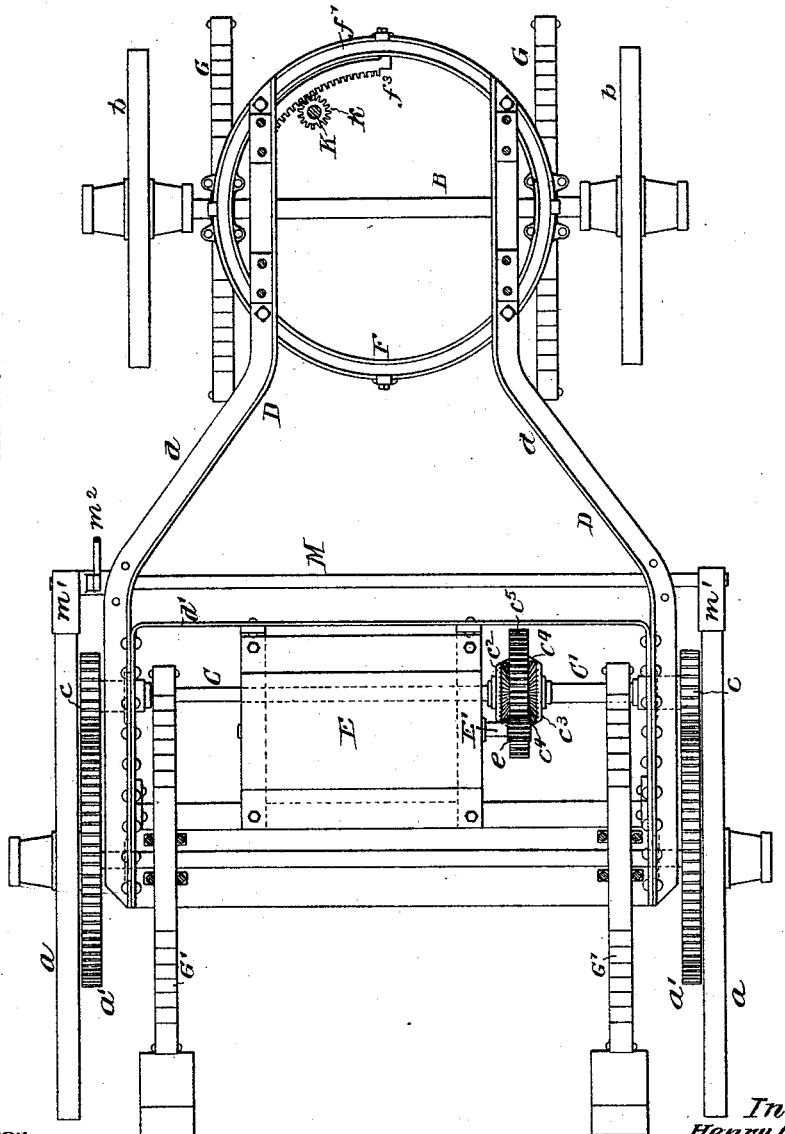

In the accompanying drawings, Figure 1 is a side view of our improved electric carriage. Fig. 2 is a front view. Fig. 3 is a plan view with the body of the carriage removed. Figs. 4 and 5 are views illustrating the construction of the fifth-wheel.

A is the rear axle on which are mounted the driving wheels $a\ a$. In the present instance the axle is stationary and the wheels revolve on the axle.

B is the front axle on which are mounted the wheels $b\ b$, and D is the frame or running gear of the carriage made of metallic beams and shapes bent into suitable form. The side bars $d\ d$ of the frame are bent so that the frame will be wide at the rear to receive the motor, and narrow at the front to connect to the fifth wheel. Between the side bars of the frame at the rear is mounted the casing $d'$ which incloses the motor E and the equalizing gearing so that the motor and gears are protected. The front end of the frame is secured to the upper ring $f$ of the fifth-wheel F, the lower ring $f'$ being secured to the front axle B through the medium of the spring G. It will be noticed that the ordinary pivot pin of the fifth-wheel is dispensed with and the two rings $f\ f'$ are secured together by clips $f^2$ the clips being fastened to one of these rings by a bolt or other fastening so that one ring will slide upon the other. Mounted between the rings are a series of balls $i$ which rest in grooves in said ring and between the balls are preferably mounted spacing segments $i'$ somewhat less in diameter than the balls so that the bearing will be taken by the balls and not by the segments. This construction of the fifth-wheel allows the carriage to be readily turned.

The body S of the carriage is mounted on bolsters $s$ secured to the frame D at the forward end directly above the fifth-wheel while the rear end of the body is mounted on springs G' secured to the axle A or to the frame D. By this arrangement the body of the carriage is elastically supported at both ends, the motor is rigidly geared to the wheels, and yet the motor frame is elastically supported at the front end, so that an easy riding vehicle is insured and the motor is in great measure relieved from the shocks caused by rough roads, without undue multiplication of springs.

In order to quickly turn the carriage we mount a segmental rack $f^3$ on the inner side of the lower ring $f'$ and on the vertical shaft K is a pinion $k$ gearing with this rack. The shaft K may be provided with a hand wheel but we prefer to gear it to a shaft K' by gear $k'$ and pinion $k^2$ so as to obtain increased leverage, and an this shaft K' is a hand wheel $K^2$ by which the shaft is turned.

On the front portion of the carriage, preferably directly under the foot board, is a box S' containing the regulator H and extending from this box is a shaft H' having a hand wheel $h$, this shaft, in the present instance, being mounted in a bearing $h'$ on the vertical shaft K' as both shafts must be within easy reach of the operator. The shaft H' is geared to the regulator H so that on turning the shaft the batteries can be thrown in or out of circuit or connected in series or multiple.

On each of the rear wheels $a\ a$ are secured gear wheels $a'$ which mesh with pinions $c\ c$ on the shaft C C'. On the shaft C is a bevel wheel $c^2$ and on the shaft C' is a bevel wheel $c^3$, these bevel wheels meshing with pinions $c^4$ carried by a gear wheel $c^5$ which gears with a pinion $e$ on the driving shaft $E'$ of the motor E. The peculiar arrangement of gears described forms an equalizing device so that the carriage will turn without undue friction.

We have shown the gear wheels $a'$ in the form of toothed rings secured to the driving wheels $a$, but they may be in the form of full wheels attached to the hub or mounted on a shaft, without departing from our invention.

M is the brake shaft mounted in bearings $m$ on the frame D and on this shaft are the shoes $m'$ engaging with the rear wheels $a$, a lever $m^2$ on the said shaft being connected to the foot lever $M'$ by a rod $m^3$ and this foot lever is within easy reach of the operator.

Under the seats $s'$ of the body S are stored the batteries which can be arranged in any suitable manner and are connected to the motor through the controller.

We claim as our invention—

1. The combination in an electric carriage, of the rear axle, the driving wheels thereon, the front axle and wheels, a frame attached to the rear axle, a ring section on the front of the frame, springs on the front axle, a ring section carried by said springs, a body attached to the frame at the forward end, springs mounted between the frame and body at the rear, an electric motor carried by the frame, an intermediate shaft mounted in bearings on the frame, pinions on the said shaft and gear wheels on the driving wheel meshing with the pinions, and equalizing gearing between the motor shaft and the intermediate shaft, substantially as described.

2. The combination in an electric carriage, of the rear axle, driving wheels thereon, a frame D, a motor on said frame, gearing between the motor and the driving wheel, a ring carried by the frame at the front, the front axle and wheels, springs on the front axle, a ring carried by said springs, balls between the ring carried by the front axle and the ring carried by the frame, clips retaining the ring in place, a body attached directly to the frame at the front end, and mounted on springs at the rear end, said body being adapted to receive the storage battery, substantially as described.

3. The combination in an electric carriage, the rear axle, driving wheels thereon, the front axle and the wheels, a frame attached to the rear axle, a ring secured to the front of the frame, springs on the front axle, a ring carried by said springs and aligning with the ring on the frame, clips for securing the rings together, the body secured to the front end of the frame, springs on which the rear end of the body is mounted, a controller mounted on the front of the body, an inclined shaft extending from the controller and a handle on said shaft, a vertical steering shaft geared to the ring of the front axle, substantially as specified.

4. The combination in an electric carriage, of the frame, the body mounted above the frame, the rear axle, the wheels front axle and wheels, ring section carried by the front axle and a ring section carried by the frame, a toothed segment on the lower ring, a vertical shaft, pinion thereon meshing with the segment, means for turning said shaft and an electric motor carried by the frame and geared to the rear wheels, a controller having an inclined shaft, a bearing on the vertical steering shaft for the inclined controller shaft, and a hand wheel for said shaft, substantially as described.

In testimony whereof we have signed our names to this specification in the presence of two subscribing witnesses.

HENRY G. MORRIS.
PEDRO G. SALOM.

Witnesses:
HENRY HOWSON,
JOSEPH H. KLEIN.